(12) United States Patent
Vijn

(10) Patent No.: US 6,182,758 B1
(45) Date of Patent: Feb. 6, 2001

(54) DISPERSANT AND FLUID LOSS CONTROL ADDITIVES FOR WELL CEMENTS, WELL CEMENT COMPOSITIONS AND METHODS

(75) Inventor: Jan Pieter Vijn, Netherlands (GB)

(73) Assignee: Halliburton Energy Services, Inc., Duncan, OK (US)

( * ) Notice: Under 35 U.S.C. 154(b), the term of this patent shall be extended for 0 days.

(21) Appl. No.: 09/385,806

(22) Filed: Aug. 30, 1999

(51) Int. Cl.$^7$ .......................... E21B 33/14; E21B 33/138
(52) U.S. Cl. .................. 166/293; 106/724; 106/725; 106/726; 106/727; 106/728; 106/730; 106/802; 106/804; 106/805; 106/806; 106/808; 106/809; 106/823; 166/293
(58) Field of Search .................................. 106/724, 725, 106/726, 727, 729, 730, 802, 804, 805, 806, 808, 809, 823; 166/293

(56) References Cited

U.S. PATENT DOCUMENTS

| | | | |
|---|---|---|---|
| 3,359,225 | 12/1967 | Welsend | 260/29.6 |
| 3,615,784 | * 10/1971 | Cattanach | 524/4 |
| 3,615,790 | * 10/1971 | Lytton | 106/166.3 |
| 4,522,653 | 6/1985 | Rao et al. | 106/90 |
| 4,557,763 | 12/1985 | George et al. | 106/90 |
| 4,818,288 | 4/1989 | Aignesberger et al. | 106/90 |
| 4,836,940 | 6/1989 | Alexander | 252/8.512 |
| 5,368,642 | * 11/1994 | Rodrigues et al. | 106/727 |
| 5,558,709 | * 9/1996 | Weichmann et al. | 106/727 |
| 5,637,144 | * 6/1997 | Whatcott et al. | 106/718 |
| 5,959,017 | 9/1999 | Eck et al. | 524/425 |

FOREIGN PATENT DOCUMENTS

| | | |
|---|---|---|
| 59-35052 | * 2/1984 | (JP). |
| 59-69456 | * 4/1984 | (JP). |
| 59-146960 | * 8/1984 | (JP). |
| 6-239651 | * 8/1994 | (JP). |

OTHER PUBLICATIONS

Cementing; Smith, Dwight K., Revised Edition, Second Printing 1990, pp. 30–33 (no month).
BASF Sales Brochure entitled: "Structural Chemistry/Adhesive Raw Materials" (no date).
Derwent Abstract No. 1975—56706W, abstract of Soviet Union Patent Specification No. 451660 (Mar. 1975).*

* cited by examiner

*Primary Examiner*—Anthony Green
(74) *Attorney, Agent, or Firm*—Craig W. Roddy; C. Clark Dougherty, Jr.

(57) ABSTRACT

Biodegradable dispersing and fluid loss control additives for well cements, well cement compositions including the additives and methods of using the well cement compositions are provided. The well cement compositions are basically comprised of a hydraulic cement, water in an amount sufficient to form a slurry and a dispersing and fluid loss control additive comprised of casein. A second agent which also provides fluid loss control can optionally be included in the additive.

11 Claims, No Drawings

DISPERSANT AND FLUID LOSS CONTROL ADDITIVES FOR WELL CEMENTS, WELL CEMENT COMPOSITIONS AND METHODS

BACKGROUND OF THE INVENTION

1. Field of the Invention

The present invention relates to subterranean well cementing operations, and more particularly, to dispersant and fluid loss control additives for well cements, well cement compositions containing the additives and methods of using the compositions.

2. Description of the Prior Art

Hydraulic cement compositions are commonly utilized in subterranean well completion and remedial operations. For example, hydraulic cement compositions are used in primary cementing operations whereby strings of pipe such as casings and liners are cemented in well bores. In performing primary cementing, a hydraulic cement composition is pumped into the annular space between the walls of a well bore and the exterior surfaces of a pipe string disposed therein. The cement composition is permitted to set in the annular space thereby forming an annular sheath of hardened substantially impermeable cement therein which supports and positions the pipe string in the well bore and bonds the exterior surfaces of the pipe string to the walls of the well bore. Hydraulic cement compositions are also utilized in remedial cementing operations such as plugging highly permeable zones or fractures in well bores, plugging cracks or holes in pipe strings and the like.

Cement composition dispersants which also reduce fluid loss are often used in well cement compositions with or without additional fluid loss control agents. Such dispersants are extensively used to reduce the apparent viscosities of the cement compositions in which they are utilized. The reduction of the viscosity of a cement composition allows the cement composition to be pumped with less friction pressure and utilizing less pump horsepower. In addition, the lower viscosity often allows the cement composition to be pumped in turbulent flow. Turbulent flow characteristics are desirable when pumping cement compositions in wells to more efficiently remove drilling fluid from surfaces in the well bore as the drilling fluid is displaced by the cement composition being pumped. The inclusion of dispersants in cement compositions is also desirable in that the presence of the dispersants facilitates the mixing of the cement compositions and reduces the water required for the cement compositions. Cement compositions having reduced water content are characterized by improved compressive strength development.

Fluid loss control agents are used in well cement compositions to reduce fluid loss from the cement compositions to permeable formations or zones into or through which the cement compositions are pumped. In primary cementing, the loss of fluid, i.e., water, to permeable subterranean formations or zones can result in premature gelation of the cement composition whereby bridging of the annular space between the permeable formation or zone and the pipe string being cemented prevents the cement composition from being placed over the entire length of the annulus.

A number of dispersing agents have been utilized heretofore in well cement compositions. For example, certain organic acids such as gluconic acid and citric acid have been recognized by those skilled in the art as well cement dispersants. However, such organic acids also function as strong cement composition set retarding agents which is often undesirable. That is, the presence of an organic acid dispersant in a cement composition prevents the cement composition from setting for a relatively long period of time which is often costly or otherwise detrimental.

Another cement composition dispersant which also exhibits fluid loss control properties in well cement compositions is the condensation product of formaldehyde, acetone and an alkali metal sulfite which is commercially available under the trade designation "CFR-3™" from Halliburton Energy Services, Inc. of Duncan, Okla. While this and other dispersants function very well in well cement compositions, they are often environmentally unacceptable in offshore well operations in that they do not undergo complete biodegradation in the environment and can cause damage to aquatic and other life therein.

Thus, there are continuing needs for improved biodegradable cement composition dispersant and fluid loss control additives, improved well cement compositions containing such additives and methods of using the cement compositions.

SUMMARY OF THE INVENTION

The present invention provides biodegradable cement dispersing and fluid loss control additives, well cement compositions and methods of using the compositions which meet the needs described above and overcome the deficiencies of the prior art. The biodegradable cement dispersing and fluid loss control additive of this invention is basically comprised of casein. However, when a second agent which also provide fluid loss control is combined with the casein, synergistic fluid loss control occurs. Examples of second agents which provide fluid loss control which can be utilized include, but are not limited to, hydroxyethylcellulose, carboxymethylcellulose, carboxymethylhydroxyethylcellulose, hydroxypropylcellulose, starch, hydroxypropylguar, guar, polyvinylalcohol and polyvinylacetate. Of these, hydroxyethylcellulose is preferred. Generally, when a second fluid loss control agent is utilized, the casein and second fluid loss control agent are present in the additive in a weight ratio of from about 1:0.1 to about 1:1, respectively.

The improved well cement compositions of this invention are basically comprised of a hydraulic cement, water present in an amount sufficient to form a pumpable slurry and a dispersing and fluid loss control additive comprised of casein. The dispersing and fluid loss control additive can also include a second fluid loss control agent as described above. The dispersing therefore and fluid loss control additive can be added in particulate solid form directly to the hydraulic cement or mix water utilized, or it can be combined with water whereby a storable aqueous solution results which can be conveniently combined with the cement composition mix water.

The methods of this invention for cementing a zone in a subterranean formation penetrated by a well bore are basically comprised of the steps of preparing a cement composition of this invention including the above described dispersing and fluid loss control additive, placing the cement composition in the zone to be cemented and allowing the cement composition to set into an impermeable solid mass therein.

It is, therefore, a general object of the present invention to provide improved biodegradable dispersant and fluid loss control additives for well cements, improved well cement compositions including the additives and methods of using the cement compositions.

Other and further objects, features and advantages of the present invention will be readily apparent to those skilled in the art upon a reading of the description of preferred embodiments which follows.

DESCRIPTION OF PREFERRED EMBODIMENTS

The biodegradable dispersing and fluid loss control additives for use in well cements of this invention is basically comprised of casein. Casein is a colloidal aggregate composed of a number of proteins together with phosphorus and calcium which occurs in milk as a heterogeneous complex known as calcium caseinate. The calcium caseinate is fractionated to produce four forms of casein, i.e., alpha-casein, beta-casein, gamma-casein and labda-casein. A mixture of the foregoing casein fractions is readily commercially available in solid particulate form which is stable up to a temperature of 100° C. or higher. For use in accordance with the present invention, the casein is preferably of a particle size of 90 mesh U.S. Sieve Series or smaller. When used in a well cement composition, the casein provides a biodegradable dispersant which also reduces fluid loss from the cement composition and has a minimal affect on thickening time and compressive strength development at temperatures in the range of from about 20° F. to about 500° F. The casein can also be used with other commonly used cementing additives without adverse results. For example, it can be used with salt, e.g., sodium chloride, in cement compositions to maintain fluidity and prevent premature gelation of the cement composition without losing its dispersing and fluid loss properties.

As mentioned above, the casein is preferably combined with a second agent which also provides fluid loss control to provide greater overall fluid loss control in well cement compositions. A variety of known biodegradable well cement composition fluid loss control agents can be utilized in accordance with this invention. Examples of such agents include, but are not limited to, hydroxyethylcellulose, carboxymethylcellulose, carboxymethylhydroxyethylcellulose, hydroxypropylcellulose, starch, hydroxypropylguar, guar, polyvinylalcohol and polyvinylacetate. Of these, hydroxyethylcellulose is preferred. The casein and the second fluid loss control agent utilized are preferably combined in a weight ratio of casein to the second fluid loss control agent in the range of from about 1:0.1 to about 1:1, respectively. When the second fluid loss control agent is hydroxyethylcellulose, the casein and hydroxyethylcellulose are preferably present in a weight ratio of about 1:0.375 respectively. The casein and hydroxyethylcellulose provide synergistically high fluid loss control properties.

The dispersing and fluid loss control additive of this invention comprised of casein or casein and a second agent which also provides fluid loss control can be combined in solid particulate form with the hydraulic cement or mix water utilized to form a well cement composition. Preferably, the particulate solid casein or mixture of casein and the second fluid loss control agent has a particle size of 90 mesh U.S. Sieve Series or smaller. When the dispersing and fluid loss control additives are utilized in offshore well cementing operations, the additives are preferably in liquid form. That is, the additives comprised of casein or casein and a second fluid loss control agent are combined with water in an amount sufficient to form an aqueous solution of the additives. The water used can be acidic or basic or it can contain one or more salts such as alkali metal and alkaline earth metal chlorides and the like. Generally, the aqueous solution must have a pH above about 8 to dissolve the casein and second fluid loss control agent, if included. At a pH below about 8, the casein will be consumed by bacteria at a temperature of 25° C. within about 1 week. A pH in the range of from about 10 to about 13 is preferred in that the resulting solution can be stored for a prolonged period of time.

Preferably, the water is fresh water containing a base such as sodium hydroxide or calcium hydroxide in an amount sufficient to adjust the pH of the aqueous solution to within a range of from about 10 to about 13. Most preferably, the aqueous solution is fresh water containing sufficient sodium hydroxide to adjust the pH to about 11 and casein is dissolved therein in an amount in the range of from about 8% to about 10% by weight of the solution. The aqueous solution can also include a second fluid loss control agent, preferably hydroxyethylcellulose. When a second fluid control agent is used, the weight ratio of casein to the second fluid loss control agent dissolved in the aqueous solution is preferably in the range of from about 1:0.75 to 1:0.1875. The resulting aqueous solution has a long storage life and can be mixed directly with the mixing water utilized to form a well cement composition.

The improved well cement compositions of the present invention are basically comprised of a hydraulic cement, sufficient water to form a pumpable slurry and a dispersing and fluid loss control additive comprised of casein or casein and a second fluid loss control agent as described above.

A variety of hydraulic cements can be utilized in accordance with the present invention including those comprised of calcium, aluminum, silicon, oxygen and/or sulfur which set and harden by reaction with water. Such hydraulic cements include, but are not limited to, Portland cements, pozzolana cements, gypsum cements, high alumina content cements, silica cements and high alkalinity cements. Portland cements are generally preferred for use in accordance with the present invention, and Portland cements of the types defined and described in *API Specification For Materials And Testing For Well Cements*, API Specification 10, Fifth Edition, dated Jul. 1, 1990 of the American Petroleum Institute are particularly preferred. API Portland cements include classes A, B, C, G and H. API classes G and H are preferred with class G being the most preferred.

The water utilized in the compositions of this invention can be fresh water, salt water, i.e., water containing one or more salts dissolved therein, brine, i.e., saturated salt water produced from subterranean formations, or seawater. Generally, the water can be from any source provided it does not contain an excess of compounds that adversely affect other components in the cement compositions. The water is present in the cement compositions of this invention in an amount sufficient to form a pumpable slurry. More particularly, the water is present in the cement compositions in an amount in the range of from about 30% to about 100% by weight of hydraulic cement therein, more preferably in an amount of about 40%.

The biodegradable dispersing and fluid loss control additives of this invention described above are included in the cement compositions of this invention in an amount in the range of from about 0.1% to about 2% by weight of cement in the compositions. The additive can be comprised of only particulate solid casein which is mixed with the hydraulic cement or mixing water prior to mixing the cement composition or it can be dissolved in water having a pH in the range of from about 10 to about 13 to form a storable liquid additive which can be mixed with the mixing water. As described above, the particulate solid casein or the aqueous solution of casein can include a second agent which also provides fluid loss control combined therewith, preferably hydroxyethylcellulose.

A preferred cement composition of this invention is comprised of a hydraulic cement, water present in an amount in the range of from about 30% to about 100% by weight of cement in the composition and a dispersing and fluid loss control additive comprised of casein present in the composition in an amount in the range of from about 0.1% to about 2% by weight of cement in the composition.

Another preferred cement composition of this invention is comprised of a hydraulic cement, water present in an amount in the range of from about 30% to about 50% by weight of cement in the composition and a dispersing and fluid loss control additive comprised of casein and a second agent which also provides fluid loss control in a weight ratio of from about 1:0.1 to about 1:1 respectively, the additive being present in the cement composition in an amount in the range of from about 0.1% to about 2% by weight of cement therein.

Still another preferred composition of this invention is comprised of API Class G Portland cement, water present in an amount of about 44% by weight of cement in the composition and a dispersing and fluid loss control additive comprised of casein and hydroxyethylcellulose in a weight ratio in the range of from about 1:0.75 to about 1:0.1875 respectively, the additive being present in the cement composition in an amount in the range of from about 0.1% to about 2% by weight of cement therein.

The basic dispersing and fluid loss control additive of this invention, i.e., casein, reduces the apparent viscosity of the cement compositions in which it is included which permits the pumping of the cement compositions with less friction pressure, less hydraulic horsepower and in many instances with turbulent flow characteristics. The additive also reduces the amount of water required during preparation of the cement compositions which improves the compressive strength development of the compositions. Further, the additive does not materially effect the thickening time or compressive strength development time of the cement compositions. When used in combination with a second fluid loss control agent, preferably hydroxyethylcellulose, the fluid loss from cement compositions including the additive is synergistically reduced.

As will be understood by those skilled in the art, the well cement compositions of this invention can include other conventional well cement additives such as set accelerators, set retarding agents, fillers, weighting materials and the like.

The methods of the present invention for cementing a subterranean zone penetrated by a well bore are basically comprised of the steps of preparing a cement composition of this invention as described above, placing the cement composition in the zone to be cemented and allowing the cement composition to set into an impermeable solid mass therein.

In order to further illustrate the dispersant and fluid loss control additives, well cement compositions and methods of the present invention, the following examples are given.

EXAMPLE 1

Equal amounts of casein having a particle size of 90 mesh U.S. Sieve Series or smaller were mixed with equal amounts of fresh water. The first mixture had a pH of 5.6 and was stirred for 45 minutes. To the second mixture a quantity of sodium hydroxide was added to adjust the pH to 11 and the mixture was stirred for 60 minutes. To the third mixture a quantity of calcium hydroxide was added to adjust the pH to 12.5 and the mixture was stirred for 20 minutes. To the fourth mixture lime was added to adjust the pH to 12.4 and the mixture was stirred for 20 minutes.

After stirring, the mixtures were observed to determine if the casein was dissolved and other characteristics of the mixtures. The components, amounts of components and the results of the observations are shown in Table I below.

TABLE I

Dissolution Of Casein In Water

| Test Mixture No. | Amount of Fresh Water Used, grams | Amount of Casein Mixed With The Water, grams | Amount of Sodium Hydroxide Mixed With Water, grams | Amount of Calcium Hydroxide Mixed With Water, grams | Amount of Lime Mixed With Water, grams | Time Mixture Was Stirred, min. | pH of Mixture | Appearance | Remarks |
|---|---|---|---|---|---|---|---|---|---|
| 1 | 300 | 30 | — | — | — | 45 | 5.6 | — | Casein did not dissolve. |
| 2 | 300 | 30 | 1.3 | — | — | 60 | 11 | Pale yellow, turbid | Casein dissolved. |
| 3 | 309 | 30 | — | 3 | — | 20 | 12.5 | — | Casein dissolved. Excess of calcium hydroxide formed a precipitate. |
| 4 | 300 | 30 | — | — | 3 | 20 | 12.5 | Pale yellow, turbid | Casein dissolved. |

As noted in Table I, the casein dissolved in test mixtures Nos. 2, 3 and 4. Solution 2 was stored for 3 months without forming a precipitate or losing its effectiveness. In order to dissolve the casein, the aqueous solution must have a pH above about 8. A solution pH in the range of from about 10 to about 13 is preferred for long storage life and continued effectiveness.

EXAMPLE 2

Test cement compositions were prepared containing fresh water, Dyckerhoff API Class G Portland cement and casein. A small amount of sodium hydroxide was added to one of the compositions. The rheology of each composition was determined at 300 rpm, 200 rpm, 100 rpm, 6 rpm and 3 rpm immediately after preparation of the composition and after conditioning at 125° F. or 180° F. The rheologies after conditioning included a maximum reading at 3 rpm after stirring was stopped for 10 seconds. The tests in this Example and the following Examples were conducted in accordance with the procedures set forth in the above mentioned API Specification 10 or their equivalents. The components, amounts of components and the results of the tests are given in Table II below.

TABLE II

Rheology Tests of Cement Compositions Containing Casein

| Test Cement Composition No. | 1 | 2 |
|---|---|---|
| Fresh Water, liters | 44 | 44 |
| Casein, % by wt. of cement | 1 | 1 |
| Sodium Hydroxide, % by wt. of cement | — | 0.3 |
| Class G Cement, kilograms | 100 | 100 |
| Cement Composition Density, kilograms/liter | 1.91 | 1.91 |
| Rheology After Preparation | | |
| 300-200-100 rpm | 42 - 28 - 13 | 38 - 26 - 13 |
| 6-3 rpm | 0.5 - 0 | 0.5 - 0 |
| Rheology After Conditioning at 125° F. | | |
| 300-200-100 rpm | 32 - 31 - 19 | — |
| 6-3 rpm-10 sec. | 5 - 4 - 9 | — |
| Rheology After Conditioning at 180° F. | | |
| 300-200-100 rpm | — | 22 - 15 - 8 |
| 6-3 rpm-10 sec. | — | 0.5 - 0.5 - 1 |
| Free Water, % by vol. | 0 | 2 |
| Settling, % by vol. | 0 | 0 |

As shown in Table II, the rheologies indicate that casein dispersed the cement compositions and that casein is effective at elevated temperatures. The addition of 0.03% by weight caustic to the second composition caused the casein to disperse more effectively at the higher pH produced.

EXAMPLE 3

Additional test cement compositions were prepared utilizing fresh water and Dyckerhoff API Class G Portland cement. Test cement composition No. 1 contained only fresh water and cement; cement composition No. 2 contained fresh water, test casein solution No. 2 described in Example 1 and cement; cement composition No. 3 contained fresh water, test casein solution No. 3 described in Example 1 and cement; and cement composition No. 4 contained fresh water, test casein solution No. 4 described in Example 1 and cement. The thickening times of the cement compositions at 125° F. and at various viscosities were determined as were the rheologies of the cement compositions after being prepared and after being conditioned at 125° F. In addition, the free water and settling of the cement compositions were determined, and after setting, the times for the compositions to reach compressive strengths of 50 psi and 500 psi were determined as well as the compressive strengths after 24 hours and after one or more days. The components, amounts of components and the results of the tests are given in Table III below.

TABLE III

Thickening Times, Rheologies And Compressive Strengths Of Casein Containing Cement Compositions

| Test Cement Compostion No. | 1 | 2 | 3 | 4 |
|---|---|---|---|---|
| Fresh Water, liters | 44 | 39.5 | 39.5 | 39.5 |
| Casein Solution 2 (Table I), liters | — | 5 | — | — |
| Casein solution 3 (Table I), liters | — | — | 5 | — |
| Casein Solution 4 (Table I), liters | — | — | — | 5 |
| Sodium Chloride, kilograms | — | — | — | — |
| Class G Cement, kilograms | 100 | 100 | 100 | 100 |
| Density, kilograms/liter | 1.91 | 1.91 | 1.91 | 1.91 |
| Thickening Time at 125° F. | | | | |
| 30 Bc, hrs:mins. | — | 0:52 | — | 2:53 |
| 70 Bc, hrs:mins. | — | 3:17 | — | 3:37 |
| 100 Bc, hrs:mins. | 2:01 | 3:23 | — | 3:53 |
| Rheology After Preparation | | | | |
| 300 - 200 - 100 rpm | 60 - 51 - 37 | 42 - 29 - 15 | 61 - 42 - 23 | 45 - 31 - 16 |
| 6 - 3 rpm | 18 - 4 | 1 - 0.5 | 3 - 3.5 | 1.5 - 1 |
| Rheology at 125° F. | | | | |
| 300 - 200 - 100 rpm | 119 - 104 - 87 | 38 - 28 - 16 | 64 - 47 - 30 | 42 - 19 - 16 |
| 6 - 3 rpm - 10 sec. | 29 - 22 | 2 - 1 - 5 | 14 - 14 - 18 | 1.5 - 1 - 4 |
| Free Water, % by vol. | 1.4 | 1.8 | — | 1.6 |
| Settling, % by vol. | — | 0 | — | 0 |
| Ultrasonic Cement Analyzer Data | | | | |
| 50 psi, hrs:mins. | — | 6:45 | — | 3:08 |
| 500 psi, hrs:mins. | — | 8:34 | — | 4:35 |
| 24 hrs, psi | — | 1798 | — | 2500 |
| Final, psi/days | — | 3061/5 | — | 2500/1 |

From Table III it can be seen that the cement compositions containing casein showed a decided dispersing effect as compared to composition No. 1 without casein. Cement composition No. 2 containing casein solution No. 2 showed the lowest rheology, but the thickening time showed an increase after 52 minutes. Test composition No. 4 containing casein solution No. 4 did not show the increase in the thickening time test, but the composition showed less decrease in rheology. The 10 second gel strength test which was performed on cement compositions 2, 3 and 4 indicates thixotropic behavior which can be beneficial in preventing 125° F., the fluid loss at 125° F., the free water and the settling of the three test cement compositions were determined. In addition, the times required for test cement composition No. 2 to reach 500 psi at 125° F. and a final compressive strength in 18 hours at the same temperature were determined using a Ultrasonic Cement Analyzer. The components, amounts of components and the results of the tests are given in Table IV below.

TABLE IV

Thickening Times, Rheologies, Fluid Losses And Compressive Strengths Of Casein and HEC

| Cement Compostion No. | 1 | 2 | 3 |
|---|---|---|---|
| Fresh Water, liters | 39.1 | 30.1 | 34 |
| Casein Solution No. (Table I), liters | — | 10 | 10 |
| Hydroxyethylcellulose (HEC) solution, liters | 5 | 5 | — |
| Class G Cement, kilograms | 100 | 100 | 100 |
| Density, kilograms/liter | 1.91 | 1.91 | 1.91 |
| Thickening Time at 125° F. | | | |
| 30 Bc, hrs:mins. | — | 5:20 | — |
| 70 Bc, hrs:mins. | — | 5:40 | — |
| 100 Bc, hrs:mins. | — | 5:50 | — |
| Rheology After Preparation | | | |
| 300 - 200 - 100 rpm | 103 - 72 - 39 | 107 - 73 - 35 | 43 - 20 - 11 |
| 60 - 30 - 6 - 3, rpm | 26 - 15 - 5 - 4 | 20 - 9 - 2 - 1.5 | 6.5 - 2.5 - 0 - 0 |
| Rheology at 125° F. | | | |
| 300 - 200 - 100, rpm | 103 - 83 - 58 | 71 - 48 - 23 | 30 - 19 - 10 |
| 60 - 30 - 6 - 3, rpm | 47 - 38 - 26 - 23 | 13 - 7 - 1.5 - 1 | 6 - 3 - 0 - 0 |
| Fluid Loss at 125° F., ml/30 min. | 660 | 38 | 777 |
| Free Water, % by vol. | 0.8 | 1.2 | 1.2 |
| Settling, % by vol. | 0 | 0 | 0 |
| Ultrasonic Cement Analyzer Data @ 125° F., 3000 psi | | | |
| 50 psi, hrs:mins. | — | — | — |
| 500 psi, hrs:mins. | — | 7:47 | — |
| Final, psi/hours | — | 2211/18 | — | cement composition settling. The compressive strength developments of cement compositions 2 and 4 containing casein solutions 2 and 4 were both relatively short. Both the thickening times and the compressive strength development times show that casein did not retard the setting and casing strength development of the cement compositions significantly. The thickening time without casein of cement composition No. 1 was 2 hours, 1 minute while the thickening times of cement compositions 2 and 4 containing casein was from 3 to 4 hours. The rheologies after preparation and after conditioning at 125° F. shows the dispersing effects of the casein solutions and that casein solution No. 2 produced the lowest rheology.

EXAMPLE 4

Three test cement compositions were prepared. Test cement composition No. 1 contained fresh water, a 7.5% by weight solution of hydroxyethylcellulose and Dyckerhoff API Class G Portland cement; test cement composition No. 2 was comprised of water, casein test solution No. 2 described in Example 1, a 7.5% by weight solution of hydroxyethylcellulose and the same cement; and test cement composition No. 3 was comprised of water, casein test solution No. 2 and the same cement. The thickening times at 125° F., the rheologies after preparation, the rheologies at From Table IV it can be seen that there is synergism between casein and hydroxyethylcellulose. That is, test cement compositions 1 and 3 including hydroxyethylcellulose only and casein only, respectively, had fluid losses above 600 ml/30 min. Test cement composition No. 2 containing both casein and hydroxyethylcellulose had a very low fluid loss of 38 ml/30 min. The weight ratio of casein to hydroxyethylcellulose in test cement composition No. 2 was 1:0.375 respectively. The thickening times, rheologies and compressive strength development for test cement composition No. 2 were acceptable and only a small amount of free water was found.

EXAMPLE 5

Additional test cement compositions containing fresh water and various amounts of casein solution No. 2 described in Example 1, a 7.5% by weight solution of hydroxyethylcellulose and API class G Portland cement were prepared. The cement compositions were tested for thickening times at 125° F., rheologies after preparation, rheologies at 125° F., fluid losses at 125° F., free water, settling and the times required after setting to reach 50 psi and 500 psi as well as the final compressive strengths after 18 to 24 hours. The components, amounts of components and the test results of the tests are given in Table V below.

TABLE V

Thickening Times, Rheologies, Fluid Losses And Compressive Strengths Of Various Ratios Of Casein And HEC In Cement Compositions

| Cement Composition No. | 1 | 2 | 3 | 4 |
|---|---|---|---|---|
| Fresh Water, liters | 24.6 | 27.4 | 29.8 | 32.2 |
| Casein Solution No. 2 (Table I), liters | 10 | 10 | 10 | 10 |
| Hydroxyethylcellulose (HEC) solution, liters | 10 | 7.5 | 5 | 2.5 |
| Class G Cement | 100 | 100 | 100 | 100 |
| Density, kilograms/liter | 1.91 | 1.91 | 1.91 | 1.91 |
| Thickening Time at 125° F. | | | | |
| 30 Bc, hrs:mins. | 2:45 | 2:22 | 4:30 | 3:05 |
| 70 Bc, hrs:mins. | 2:58 | 2:42 | 5:50 | 3:27 |
| 100 Bc, hrs:mins. | 3:47 | 3:14 | 6:05 | 3:30 |
| Rheology After Preparation | | | | |
| 300 - 200 - 100, rpm | 288 - 208 - 118 | 213 - 151 - 82 | 172 - 127 - 68 | 118 - 83 - 44 |
| 60 - 30 - 6 - 3, rpm | --9 - 6 | 52 - 27 - 7 - 4 | 43 - 22 - 5 - 3 | 27 - 14 - 3 - 1.5 |
| Rheology at 125° F. | | | | |
| 300 - 200 - 100, rpm | 190 - 135 - 72 | 128 - 94 - 49 | 115 - 89 - 39 | 60 - 43 - 21 |
| 60 - 30 - 6 - 3, rpm | --5 - 3 | 30 - 15 - 3 - 2.5 | 23 - 11 - 2 - 1.5 | 12 - 6 - 1.5 - 0.5 |
| Fluid Loss at 125° F. | 22 | 26 | 32 | 36 |
| Free Water, % by vol. | — | — | ~2% | 2% |
| Settling, % by vol. | — | — | 0 | trace |
| Universal Cement Analyzer Data @ 125° F., 3000 psi | | | | |
| 50 psi, hrs:mins. | 5:09 | 4:04 | 0:47 | 4:28 |
| 500 psi, hrs:mins. | 6:21 | 5:38 | 6:50 | 5:32 |
| Final, psi/hrs | 2739/24 | 2734/18 | 3110/22 | 2665/18 |

The ratios of casein to hydroxyethylcellulose in the test cement compositions were varied to find the optimum ratio based on the test results. The results show that fluid loss less than 40 ml/30 min. were obtained by the test cement compositions containing various combinations of casein and hydroxyethylcellulose. The weight ratio of casein to hydroxyethylcellulose can be as low as from about 1 to about 0.1875 respectively, without compromising fluid loss which represents a significant savings in cost. In addition, the rheology can be tuned from high (as in test cement composition No. 1) to low (as in composition No. 4) as required. All of the test compositions show a minimum of free water, short thickening times and short compressive strength development times which are preferred.

EXAMPLE 6

Additional test cement compositions were prepared containing fresh water, various amounts of casein solution No. 2 described in Example 1 and API Class G Portland cement. In addition, three of the samples included various quantities of salt, i.e., sodium chloride. The cement compositions were tested for thickening times at 125° F., rheologies after preparation, rheologies at 125° F., free water, settling and times required after setting to reach 50 psi and 500 psi compressive strengths as well as the final compressive strength after 24 hours. The components, amounts of components and the test results of the tests are given in Table VI below.

TABLE VI

Thickening Times, Rheologies And Compressive Strengths Of Casein And Salt Containing Cement Compositions

| Cement Composition No. | 1 | 2 | 3 | 4 |
|---|---|---|---|---|
| Fresh Water, liters | 34 | 34 | 34 | 34 |
| Casein Solution No. 2 (Table I), liters | 10 | 10 | 10 | 10 |
| Sodium Chloride Salt, % by wt. of water | — | 5 | 18 | 35 |
| Class G Cement, kilograms | 100 | 100 | 100 | 100 |
| Density, kilograms/liter | 1.91 | 1.92 | 1.95 | 1.96 |
| Thickening Time at 125° F. | | | | |
| 100 Bc, hrs:mins. | 3:56 | 8:28 | 6:51 | 11:15 |
| Rheology After Preparation | | | | |
| 300 - 200 - 100, rpm | 43 - 20 - 11 | 77 - 60 - 44 | 56 - 40 - 23 | 80 - 62 - 47 |
| 6 - 3, rpm | 0 - 0 | 25 - 20 | 10 - 9 | 37 - 37 |
| Rheology at 125° F. | | | | |
| 300 - 200 - 100, rpm | 30 - 19 -10 | 51 - 35 - 19 | 73 - 52 - 28 | 53 - 37 - 23 |
| 6 - 3, rpm | 0 - 0 | 2 - 1 | 5 - 4 | 7 - 6 |
| Free Water, % by vol. | 3 | 1 | 4.8 | 4 |
| Settling, % by vol. | 0 | 0 | 0 | 0 |

TABLE VI-continued

Thickening Times, Rheologies And Compressive Strengths Of Casein And Salt Containing Cement Compositions

| Cement Composition No. | 1 | 2 | 3 | 4 |
|---|---|---|---|---|
| Universal Cement Analyzer Data @ 125° F., 3000 psi | | | | |
| 50 psi, hrs:mins. | — | 23:40 | 21:58 | — |
| 500 psi, hrs:mins. | — | 25:35 | 24:35 | 10:18 |
| 24 hrs, psi | — | 500 | 1297 | 1585 |

The results of the tests given in Table VI show that casein disperses the cement composition in the presence of salt. However, a disadvantage of including salt in a cement composition is that the thickening time and compressive strength development time of the cement composition will be extended.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of cementing a subterranean zone penetrated by a well bore comprising the steps of:
   (a) preparing a cement composition comprising a hydraulic cement, sufficient water to form a pumpable slurry and a dispersing and fluid loss control additive comprised of casein;
   (b) placing said cement composition in said zone to be cemented; and
   (c) allowing said cement composition to set into an impermeable solid mass therein.

2. The method of claim 1 wherein said dispersing and fluid loss control additive in said composition further comprises sufficient water to form an aqueous solution of said casein.

3. The method of claim 2 wherein said dispersing and fluid loss control additive in said composition further comprises a base present in an amount sufficient to adjust the pH of said aqueous solution to within the range of from about 10 to about 13.

4. The method of claim 1 wherein said dispersing and fluid loss control additive in said composition further comprises a second agent which also provides fluid loss control.

5. The method of claim 4 wherein said second fluid loss control agent in said additive is selected from the group consisting of hydroxyethylcellulose, carboxymethylcellulose, carboxymethylhydroxyethylcellulose, hydroxypropylcellulose, starch, hydroxypropylguar, guar, polyvinylalcohol and polyvinylacetate.

6. The method of claim 4 wherein said casein and said second fluid loss control agent are present in said additive in a weight ratio of from about 1:0.1 to about 1:1 respectively.

7. The method of claim 4 wherein said second fluid loss control agent in said additive is hydroxyethylcellulose.

8. The method of claim 7 wherein said casein and said hydroxyethylcellulose are present in said additive in a weight ratio of about 1:0.375 respectively.

9. The method of claim 1 wherein said hydraulic cement in said composition is Portland cement.

10. The method of claim 1 wherein said water in said cement composition is present in an amount in the range of from about 30% to about 100% by weight of cement in said composition.

11. The method of claim 1 wherein said dispersing and fluid loss control additive in said cement composition is present in an amount in the range of from about 0.1% to about 2% by weight of cement in said composition.

* * * * *